United States Patent [19]

Basili et al.

[11] 4,291,801
[45] Sep. 29, 1981

[54] VIDEO CASSETTE STORAGE CONTAINER

[75] Inventors: Robert A. Basili, Waldwick; William B. Wilson, Middlesex, both of N.J.

[73] Assignee: Plastic Reel Corporation of America, Wood Ridge, N.J.

[21] Appl. No.: 193,792

[22] Filed: Oct. 3, 1980

[51] Int. Cl.³ ............................................. B65D 85/67
[52] U.S. Cl. .................................. 206/387; 206/493
[58] Field of Search ............... 206/387, 459, 493, 446

[56] References Cited

U.S. PATENT DOCUMENTS

| 3,179,327 | 4/1965  | Burton et al.    | 206/459 |
| 3,229,811 | 1/1966  | Studwell         | 206/387 |
| 3,896,929 | 7/1975  | Mills            | 206/387 |
| 3,917,067 | 11/1975 | Brown et al.     | 206/387 |
| 4,101,030 | 7/1978  | Kroeber          | 206/387 |
| 4,184,594 | 1/1980  | Hehn             | 206/387 |
| 4,211,337 | 7/1980  | Weavers et al.   | 206/387 |

Primary Examiner—Joseph Man-Fu Moy
Attorney, Agent, or Firm—Anthony J. Casella

[57] ABSTRACT

A container for storing and transporting video cassettes of different sizes includes an array of flexible retaining posts affixed to one of the inner surfaces of the container and disposed in spaced relationship so to engage a single access opening in a video cassette in an interference fit manner, thus holding the cassette securely inside the container.

7 Claims, 5 Drawing Figures

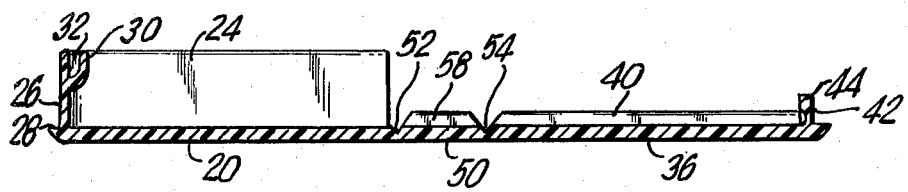
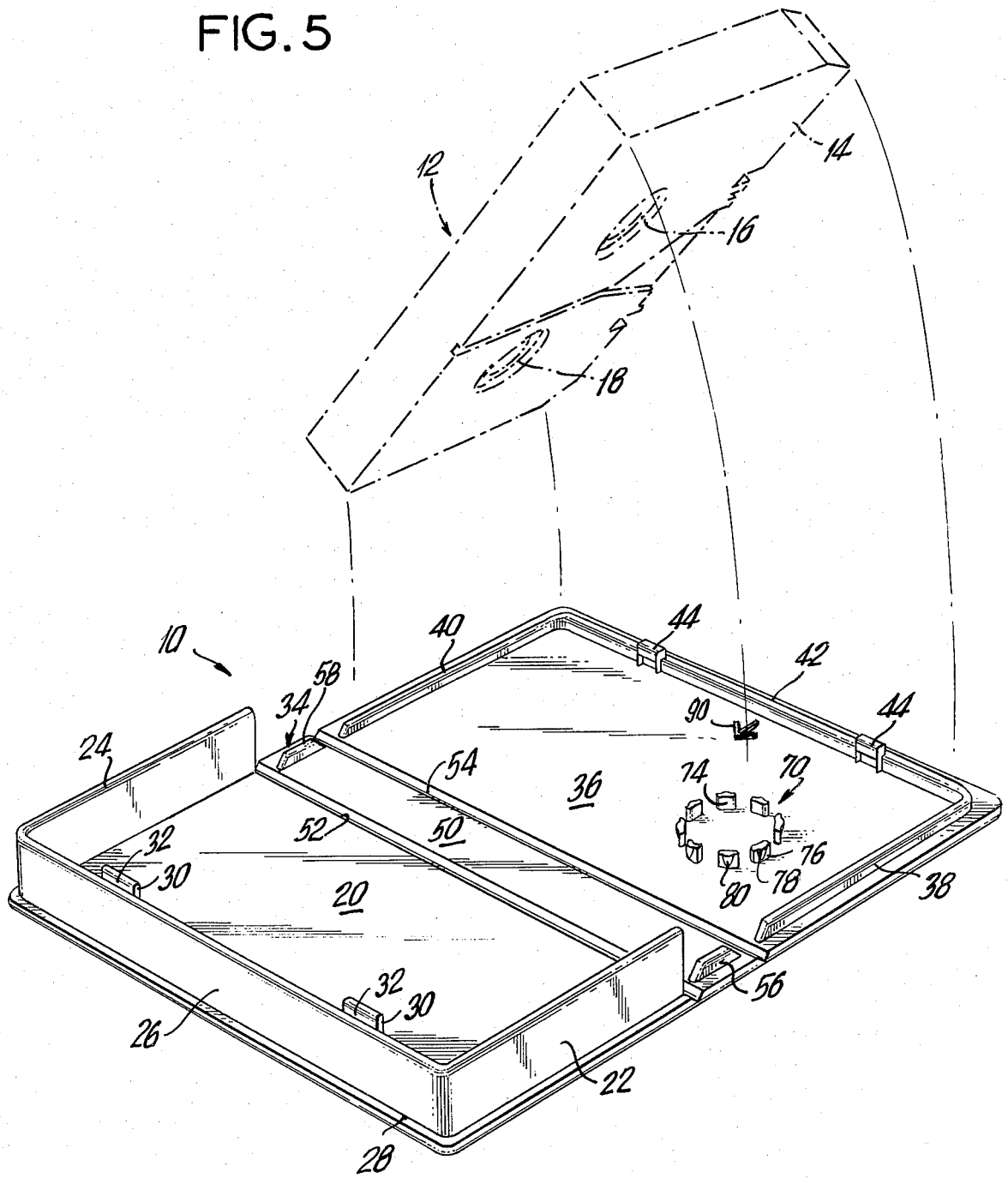
FIG. 5
FIG. 1

VIDEO CASSETTE STORAGE CONTAINER

BACKGROUND OF THE INVENTION

The present invention relates to a storage container for video cassettes, and more particularly a universal video cassette storage container capable of accommodating video cassettes of various sizes and dimensions.

The usage of video cassettes has increased dramatically both in industrial and consumer applications, and thus there is a need at present for a container capable of accommodating video cassettes both for storage and shipping purposes. Although there are several types of video cassette containers available on the market at present, in general, each of such prior art containers have certain shortcomings, as more particularly noted hereinafter.

The conventional video cassette is generally made up of two reels which hold the video tape and which are rotatably mounted within a housing. The housing has a generally planar, rectangular configuration and includes two annular, access holes which give access to the hubs of the reels. When the video cassette is played on a recording machine which manipulates the video tape, two actuating hubs from the recording machine extend through the access holes of the video cassette housing and engage the hubs of the reels.

Video cassettes made by various manufacturers are basically of two different sizes, with the spacing between the access holes being different. Also, the diameters of the access holes of video cassettes made by various manufacturers are slightly different in dimensions. Because of these dimensional differences in video cassettes made by various manufacturers, the prior art video cassette containers have been generally limited to the use of one or two types of video cassettes made by various manufacturers.

As examples of prior art video cassettes which are designed to accommodate only a specified type of video cassette are the storage containers disclosed in U.S. Pat. No. 3,876,071 issued Apr. 8, 1975; U.S. Pat. No. 4,011,940 issued Mar. 13, 1977; U.S. Pat. No. 4,054,206 issued Oct. 18, 1977; and U.S. Pat. No. 4,078,657 issued Mar. 14, 1978. In view of the fixed spacing of the hub-engaging members of each storage container according to the teachings of the above mentioned patents, each container is limited to use with a specific dimensioned video cassette, and thus in order to accommodate cassettes wherein the spacing of the access holes is different, it would be necessary to redesign the video storage container in order to adjust the spacing of the hub engaging members.

U.S. Pat. No. 4,184,594 which issued on Jan. 22, 1980 provides a storage container which is capable of accommodating two different sizes of video cassettes, where the spacing between the access holes is different. In U.S. Pat. No. 4,184,594, there is disclosed a storage container capable of containing two different sizes of video cassettes by means of a pair of projections molded integrally within the top or bottom wall of the container. One of the projections is a pair of annular concentric members which extends into one of the access openings formed in the cassette. The other projection is an oval-shaped member formed by two semi-circular arcuate sections which terminate in end posts. One of the arcuate sections extends into a second access opening in the cassette and coincides with an outer arcuate curved section of the access opening when storing a small size cassette. The other arcuate section coincides with the inner arcuate curved section of an access opening when storing a larger size cassette. Accordingly, the storage container of U.S. Pat. No. 4,184,594 is limited to accommodating either one of two different size video cassette. Furthermore, a storage container made according to the teachings of U.S. Pat. No. 4,184,594 must be of fairly precise construction in order to conform to the differential spacing in the openings within a video cassette. Still further, the resulting retaining means in the container disclosed in U.S. Pat. No. 4,184,594 are of fairly complicated construction, thereby increasing the cost of manufacture of such storage container.

Accordingly, it is the object of the subject invention to provide a video cassette storage container which is capable of accommodating video cassettes of various sizes and dimensions, and which is operative to positively grip and hold a video cassette within the container regardless of dimensional variations in the size of the access holes in the video cassette.

It is a further object of the subject invention to provide a universal video cassette storage container which firmly grips the video cassette by a single retaining means so as to positively locate the video cassette within the storage container for facilitating storage and transporting of the video cassette.

It is still a further object of the subject invention to provide a universal video cassette storage container which is easy to use, of rigid construction, and relatively inexpensive to manufacture.

SUMMARY OF THE INVENTION

In accordance with the above and further objects and advantages, the improved universal video cassette storage container of the subject invention is formed having spaced side, end, top and bottom walls forming a hollow enclosure for selectively containing different size cassettes therein, with the means for positively engaging the storage container with the video cassette basically comprising a plurality of flexible retaining sectors fixed to and extending perpendicularly from either the top or bottom panel. The sectors are defined by arcuate segments which are flexible and which are arranged so as to form an interference fit with a single access hole in a video cassette thereby positively fixing the video cassette with respect to the container. Preferably, the flexible sectors comprise an annular array of generally arcuate, flexible segments which project from either the bottom or top wall of the container and which, in their relaxed condition, have an outside diameter slightly greater than the diameter of the access opening in the video cassette. Accordingly, when a video cassette is mounted or snapped into the subject storage container, the individual segments are forced radially inwardly, thereby effecting an interference fit between the retaining sectors and the video cassette for fixedly locating and holding the cassette within the container.

BRIEF DESCRIPTION OF THE DRAWINGS

FIG. 1 is a perspective view of the storage container of the subject invention and including a conventional video cassette shown in phantom lines preparatory to being mounted within the storage container;

FIG. 5 is a cross-sectional view taken along line 5—5 in FIG. 2.

DETAILED DESCRIPTION OF THE PREFERRED EMBODIMENT

Figure 3:
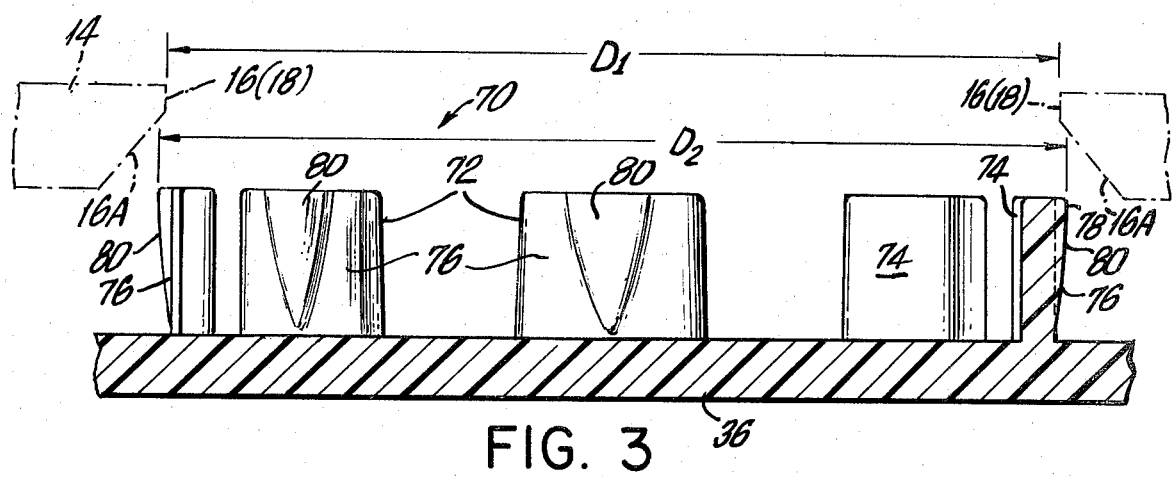
FIG. 3 is a cross-sectional view taken along line 3—3 in FIG. 2, preparatory to the mounting of a video cassette into the storage container of the subject invention.

Referring to FIG. 1, the new and improved universal cassette storage container of the subject invention is generally designated by the numeral 10 and is adapted to accommodate a video cassette, designated by the numeral 12. The video cassette 12 is of conventional rectangular configuration and houses two reels (not shown), the hubs of which are accessible through access holes 16 and 18 which are of a fixed diameter and are provided in one planar surface 14 of the video cassette. As noted above, for different type cassettes the spacing between the access holes 16 and 18 may vary, whereas most presently available cassettes have access holes which have diameters that are generally of the same dimensions. Furthermore, as shown in FIG. 3, each access hole 16, 18 formed in a cassette is usually formed with a chamfered edge surface 16A disposed on the internal surface of the planar surface 14.

The universal video storage container 10 is also of generally rectangular, box-shaped configuration and in its closed position forms a hollow enclosure for storage and shipment of the video cassette 12. Preferably the storage container 10 is formed from a molded plastic material, such as polypropylene. The storage container 10 includes a rectangular-shaped flat wall panel 20 having upstanding parallel end walls 22 and 24, and a front wall, designated by the numeral 26. The upstanding walls 22, 24, and 26 are preferably formed integral with the wall panel 20 and are arranged in a generally U-shaped configuration to enclose three sides of the wall panel 20. Preferably, the walls 22, 24, and 26 are disposed slightly inwardly a short distance from the outer edges of wall 20 to form an outer, exposed U-shaped portion 28 extending about the periphery of wall 20. Formed on the inner surface of front wall 26 are a pair of tab receiving hollow members 30, 30 that include top openings 32, 32 and which form a portion of the locking means for the storage container 10.

The wall panel 20 is hingedly connected by a double hinged panel assembly, indicated generally at 34 to a flat, rectangular-shaped lid 36. Lid 36 is similar in size and configuration to the wall panel 20, and has integrally formed therewith a U-shaped flange which projects upwardly from the inside surface of the lid 36. The U-shaped flange includes a pair of parallel end portions 38 and 40, and an outer connecting front portion 42. The U-shaped flange 38-42 is spaced a short distance inwardly from the outer edges of the lid 36, similar to the inward spacing of the walls 22, 24, and 26 on the bottom panel 20.

Formed on the front portion 42 of the U-shaped flange are a pair of spaced tabs 44, 44 which are adapted to fixedly engage the tab-receiving members 30, 30 when inserted through the openings 32, 32 in order to fixedly secure the lid 36 in the closed position. Preferably the tabs 44, 44 are molded integrally with the front portion 42.

The hinge assembly 34 comprises an elongated, rectangular-shaped panel 50 of a thickness corresponding to the thickness of the wall panel 20 and the lid 36, with panel 50 being connected to the inner edges of the wall 20 and lid 36 along respective hinge lines 52 and 54. Disposed at the opposite ends of the panel 50 are a pair of upstanding transversely extending flanges 56 and 58 which are respectively aligned with the flange portions 22-38 and 24-40 of the panel wall 20 and lid 36.

The video cassette storage container 10 of the subject invention includes means, designated by the numeral 70 for positively engaging an access aperture 16 or 18 in a video cassette 12 for positively maintaining and locating the cassette within the storage container 10. More particularly, as illustrated in FIGS. 1 through 4, the video cassette storage container 10 includes a plurality of elongated flexible retaining sectors 72 which are preferably disposed in an array and are molded integral with the lid 36 and extend perpendicular thereto. Alternatively, the flexible retaining sections 72 may be formed on the inside surface of the wall panel 20.

Figure 2:
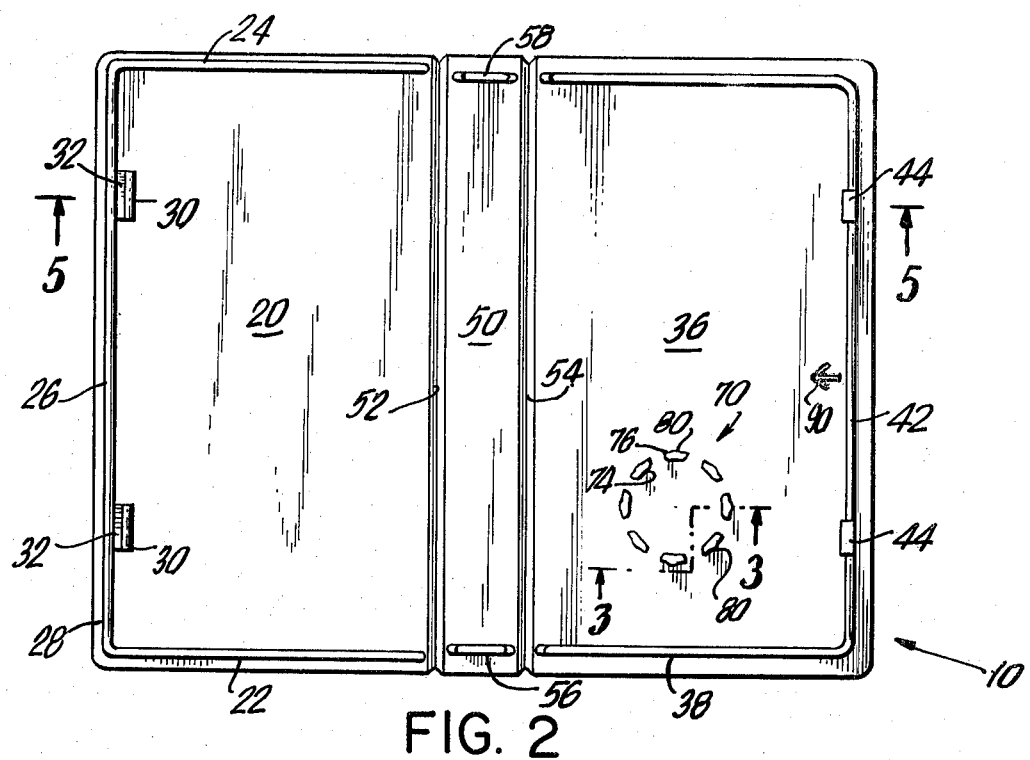
FIG. 2 is a plan view of the storage container of the subject invention.
Figure 4:
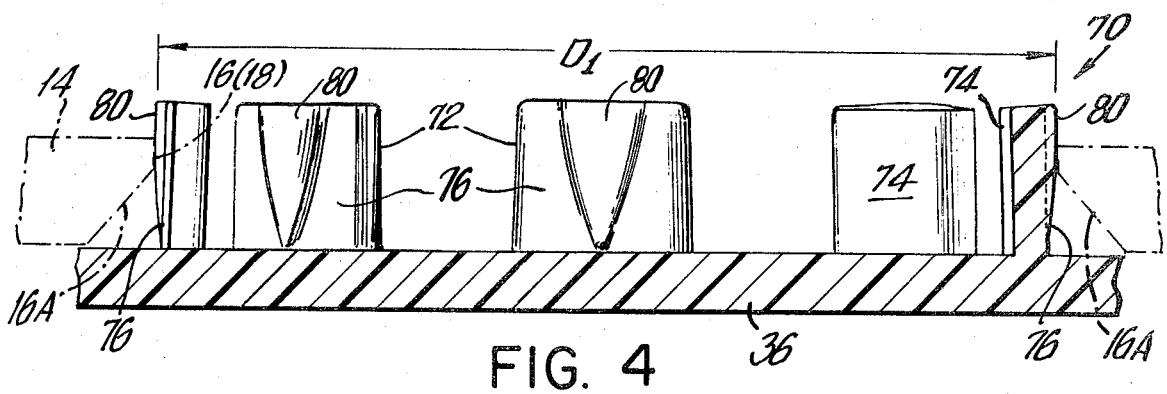
FIG. 4 is a view similar to FIG. 3 subsequent to the mounting of the video cassette in the storage container.

Each sector 72 is formed of a molded plastic material and is generally arcuate, as viewed in plan view as shown in FIG. 2, and is of a width so as to insure that the sector 72 is flexible for radially inward movement, as more fully described hereinafter. Each sector 72 includes a radially inner surface 74 and a radially outer surface 76 (see FIGS. 3 and 4) and effectively forms a cantilevered beam extending perpendicular to the surface of the lid 36, with the distal end 78 of each sector being free for radially inward movement. Each sector 72 is also preferably formed to include a longitudinally extending rib 80 disposed on the radially outer surface 76 of each sector. Each rib 80, as shown in FIGS. 3 and 4, is preferably tapered in thickness extending from the distal end 78 to the interconnection of the sector 72 with the lid 36. In addition, each rib 80, as shown in FIG. 1, is preferably tapered in width extending from the distal end 78 of the sector 72 to the connection of the sector with the lid 36. By virtue of this arrangement, the array of sectors 72 forming the retaining means 70 have an initial relaxed outer diameter, designated $D_2$ in FIG. 3. The dimension $D_2$ is slightly greater than the fixed diameter $D_1$ of an access hole 16 in the conventional video cassette 12. Accordingly, when video cassette 12 is snapfitted into the new and improved universal video cassette storage container 10 of the invention, by virtue of the fact that the diameter $D_2$ is greater than $D_1$, each of the plurality of sectors 72 of the retaining means 70 is flexed radially inwardly toward the center of the array of sectors. At such time, the chamfered internal surface 16A of the access hole functions as a cam to aid in flexing of the sectors 72 radially inwardly until the video cassette 12 is fully seated in the storage container 10. At such time the surface 14 of the video cassette 12 is contiguous with the internal surface of the lid 36, and the sectors 72 are in a radially inwardly position such that the diameter of the imaginary circle interconnecting the outer surfaces 76 of the sectors 72 corresponds in dimensions to $D_1$, as shown in FIG. 4.

It is noted that the tapered configuration of each rib 80 (being tapered both in width and in thickness) aids in establishing the interference fit between the retaining means 70 and the access hole 16 of the video cassette. It is further noted that only a single retaining means in the form of a single plurality or array of sectors 72 is required in the storage container of the subect invention to fixedly locate and maintain a video cassette within the storage container 10. Furthermore, the subject retaining means 70 is capable of accommodating the video cassettes of various sizes and shapes regardless of the spacing between the two access holes provided in the video cassette, since the retaining means 70 only engages a single access hole in the video cassette.

After the video cassette is engaged to form the interference fit with the retaining means, the lid and wall panel 20 may be rotated relative to each other for closing of the container at which time the tabs 44, 44 engage tab receiving portions 30, 30.

Preferably, as shown in FIGS. 1 and 2, a raised projection 90 in the configuration of an arrow is molded on the inside surface of the lid 36 and is positioned to align with an arrow that is provided on all standard video cassettes. More particularly, each video cassette has printed on the upper surface thereof an arrow (not shown on video cassette 12) to aid the user in inserting the video cassette into a recorder. This same arrow is of assistance in connection with the mounting of the video cassette 12 into the video cassette container 10 of the subject invention. To insert the video cassette 12 into the subject video container 10, the user lines up the arrow on the video cassette with the arrow 90 on the container 10, and then pushes down on the video cassette 12 over the retaining means 70 to snap the video cassette into the container 10. To remove the video cassette from the container 10, the user holds the container with the arrow on the cassette, facing toward the right, he grasps the cassette firmly at the top thereof with his thumb and middle finger, while firmly holding the container 10 with the other hand. He then pulls the video cassette out of the container 10 resulting in a snap release sound which will accompany removal of the cassette from the container 10.

Although the invention has been described with reference to a preferred embodiment thereof, it is readily apparent that various modifications, alterations, and changes may be made therein without departing from the spirit and scope of the invention as defined by the appended claims. For example, in lieu of employing an array of eight retaining sectors as illustrated in the drawings, at least two opposed flexible retaining sectors may be employed, and the retaining means may be affixed to either the wall panel 20 or the lid 36.

What is claimed:

1. A universal storage container capable of accommodating various sizes of video cassettes, each cassette including access holes, with the spacing between said access holes being non-uniform, said container comprising:
    a generally rectangular housing having top, bottom, and side wall panels; and
    a single circular array of elongated, flexible retaining sectors extending from said top or bottom panel, said sectors being uniformly spaced from a center point and defining an imaginary circle which is of slightly greater diameter than the diameter of an access hole in the video cassette, each said sector being disposed in spaced relationship within said housing so as to be generally aligned with an access hole in a video cassette, whereby when a video cassette is mounted within said housing, with said retaining sectors being received within a single access hole therein, said flexible retaining sectors are biased radially inwardly to create an interference fit with the periphery of said single access hole for maintaining said cassette fixedly secured within the housing.

2. A universal storage container as in claim 1 wherein the longitudinal axis of each flexible retaining sector extends generally perpendicular to the plane of the top or bottom panel from which the sector extends.

3. A universal storage container as in claim 1 wherein said container is formed of molded plastic material.

4. A universal storage container as in claim 1 wherein each sector includes a radially inner surface and a radially outer surface, with an elongated rib disposed on the radially outer surface thereof and extending generally parallel to the length of the elongated flexible retaining sector.

5. A universal storage container as in claim 4 wherein each said rib is tapered from the distal end of each sector toward the respective top or bottom panel to which the sector is connected.

6. A universal storage container as in claim 1 wherein a projection in the configuration of an arrow is molded on the inside surface of the panel from which the flexible retaining sectors project for aiding in installing and removing a video cassette from a storage container.

7. A universal storage container as in claim 1, wherein said container includes integral locking means.

* * * * *